United States Patent
Jotshi et al.

(10) Patent No.: US 10,089,707 B2
(45) Date of Patent: Oct. 2, 2018

(54) ULTRA HIGH RESOLUTION PAN-SCAN ON DISPLAYS CONNECTED ACROSS MULTIPLE SYSTEMS/GPUS

(71) Applicant: Nvidia Corporation, Santa Clara, CA (US)

(72) Inventors: Praful Jotshi, Pune (IN); Uday Dhoke, Pune (IN); Aamod Gokhale, Pune (IN)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 15/043,946

(22) Filed: Feb. 15, 2016

(65) Prior Publication Data
US 2017/0236242 A1    Aug. 17, 2017

(51) Int. Cl.
*G06T 1/20* (2006.01)

(52) U.S. Cl.
CPC ....................... *G06T 1/20* (2013.01)

(58) Field of Classification Search
None
See application file for complete search history.

(56) References Cited

U.S. PATENT DOCUMENTS

| | | | | |
|---|---|---|---|---|
| 2002/0064226 A1* | 5/2002 | Bauer | ................... | H04N 19/172 375/240.02 |
| 2009/0234919 A1* | 9/2009 | Jefremov | ............ | H04L 43/0894 709/204 |
| 2013/0138649 A1* | 5/2013 | Broberg | ............ | G06F 17/30215 707/736 |
| 2014/0285502 A1* | 9/2014 | Hobbs | ....................... | G06F 3/14 345/520 |
| 2015/0326895 A1* | 11/2015 | Suh | ....................... | H04N 21/845 725/116 |
| 2016/0165285 A1* | 6/2016 | Toh | ........................ | G06F 13/00 725/14 |

* cited by examiner

*Primary Examiner* — Kee M Tung
*Assistant Examiner* — Yanna Wu

(57) ABSTRACT

A server and methods for performing an ultra-high resolution pan-scan on displays connected across multiple client GPUs are provided. In one embodiment, one of the methods includes: 1) rendering a surface that exceeds resolutions of displays connected to multiple client GPUs; 2) receiving viewport coordinates of one of the displays that is connected to one of the multiple client GPUs; 3) encoding only a portion of the surface that corresponds to the viewport coordinates; 4) sending the portion to the one of the multiple client GPUs.

20 Claims, 2 Drawing Sheets

Figure 1:
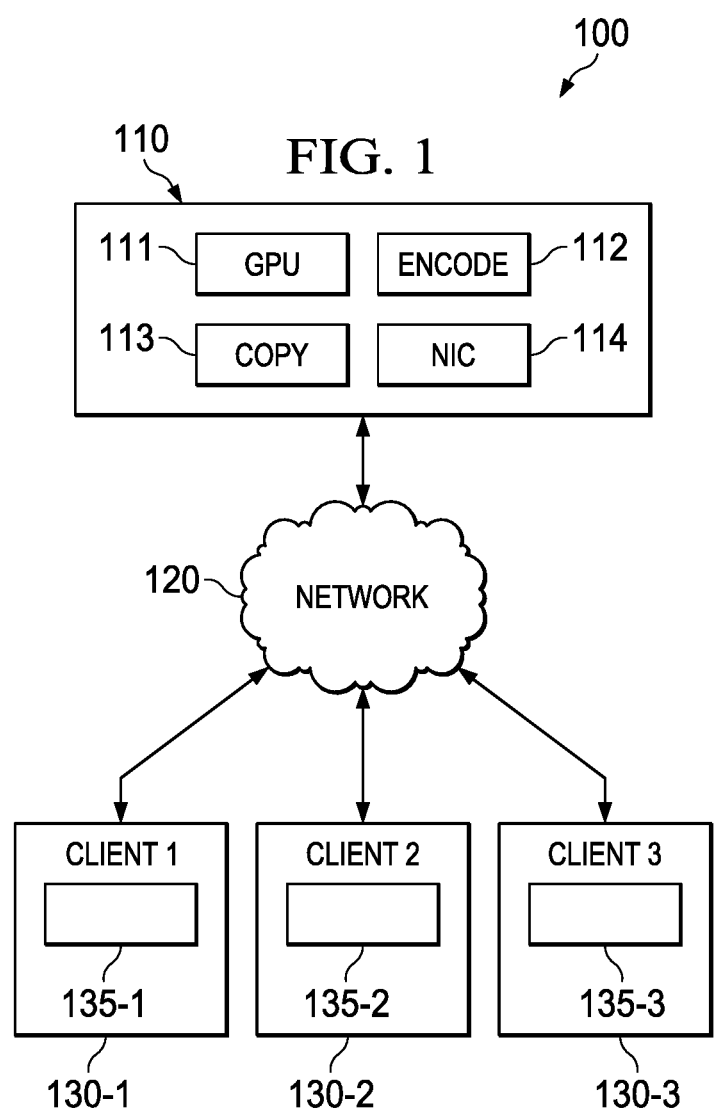

ULTRA HIGH RESOLUTION PAN-SCAN ON DISPLAYS CONNECTED ACROSS MULTIPLE SYSTEMS/GPUS

TECHNICAL FIELD

This application is directed, in general, to performing a pan-scan and, more specifically, to performing an ultra-high resolution pan-scan on displays connected across multiple systems/graphics processing units (CPUs).

BACKGROUND

In a server-client remote graphics processing arrangement, graphics content is rendered and encoded at a central server and then transferred to a client. The client decodes the video stream and pan-scans the content based on the viewport of the client's display. As the viewport of the client's display is not known to the server at the time of encoding, the entirety of the rendered graphics content is encoded and transferred to the client. As such, when large or ultra-high resolution content is rendered, encoding and transferring such surface places tremendous burden on the encode engine of the server and the bus, e.g., a Peripheral Component Interconnect (PCI) or a network, over which the surface is transferred to the client.

For example, System A, i.e. a central server, renders a large mosaic surface having a resolution of 16K×16K, using, for example, Nvidia®'s Mosaic multi-display technology. System B, i.e. a client, wants to display this surface on a display having a resolution of 4K×2K. But encoding the rendered 16K×16K surface on System A is problematic due to the limitations of the encode engine in the server; even the most advanced encode engine, e.g., Nvidia®'s Maxwell's encode engine, can only encode up to 4K×4K surface. As such, the surface is copied unencoded from System A's video memory to its system memory. The transfer of this raw (unencoded) data chokes the bus inside the System A and slows down other processes simultaneously running on the System A. Moreover, when this raw data is transferred from System A to System B, it also chokes the bus between the systems.

Previously, some of these problems were alleviated by using Windows device drivers, e.g., Mirror Driver, in a virtual networking computing environment. However, such device drivers do not work well with some of the current Windows features, e.g., AERO, because they alter the original details of the large (ultra-high resolution) surface when rendering and in some cases, is just too slow to use.

SUMMARY

One aspect of this application provides a method for performing an ultra-high resolution pan-scan on displays connected across multiple client GPUs. In one embodiment, the method includes: 1) rendering a surface that exceeds resolutions of the displays connected to the multiple client GPUs; 2) receiving viewport coordinates of one of the displays; 3) encoding only a portion of the surface that corresponds to the viewport coordinates; and 4) sending the portion to one of the multiple client GPUs that is connected to the one display.

In another embodiment, the method includes: 1) calculating viewport coordinates of one of the displays connected to the multiple client GPUs; 2) sending the viewport coordinates to a server; 3) receiving an encoded portion of a rendered surface that corresponds to the viewport coordinates, the surface exceeding resolutions of the displays; and 4) scanning out the encoded portion using one of the multiple GPUs that is connected to the one display.

Another aspect of this application provides a graphics server for performing an ultra-high resolution pan-scan on displays connected across multiple client GPUs. In one embodiment, the graphics server includes: 1) a GPU configured to render a surface that exceeds resolutions of displays connected to the multiple client GPUs; 2) an encode engine configured to encode only a portion of the surface that corresponds to viewport coordinates of one of the displays that is connected to one of the multiple client GPUs; and 3) a network interface card configured to receive the viewport coordinates from the one of the multiple client GPUs and send the portion to the one of the multiple client GPUs.

BRIEF DESCRIPTION

Figure 2:
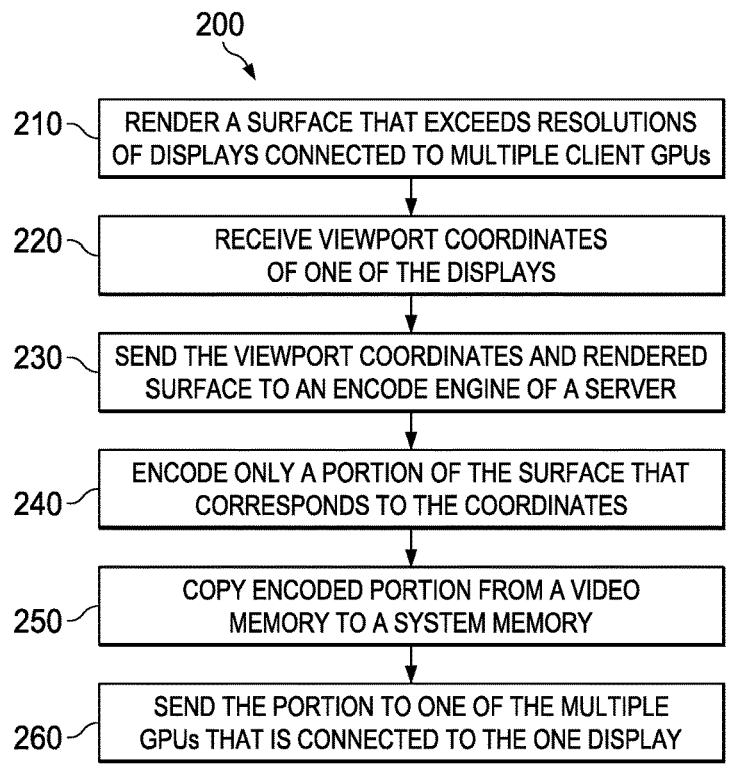
Figure 3:
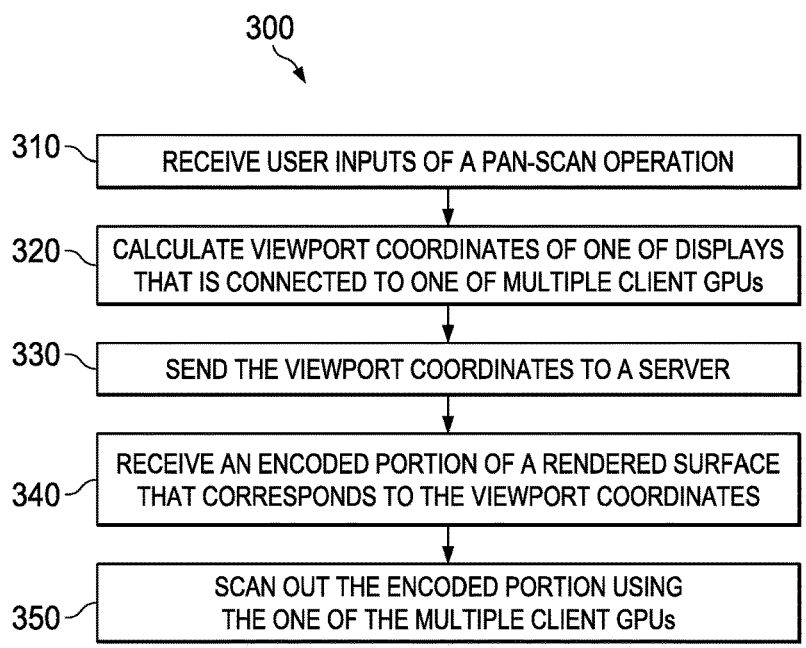

Reference is now made to the following descriptions taken in conjunction with the accompanying drawings, in which:

FIG. 1 is a block diagram of one embodiment of a server-client graphics processing system constructed according to the principles of the disclosure;

FIG. 2 is a flow diagram of one embodiment of a method for performing an ultra-high resolution pan-scan on displays connected across multiple systems that is carried out according to the principles of the disclosure; and FIG. 3 is a flow diagram of another embodiment of the method for performing an ultra-high resolution pan-scan on displays connected across multiple systems that is carried out according to the principles of the disclosure.

DETAILED DESCRIPTION

As stated above, performing a pan-scan on displays connected across multiple client GPUs is challenging when the rendered surface exceeds resolutions of displays connected to the clients and the encoding capacity of the central server. Using Windows device drivers does not effectively solve this challenge as it compromises the finer details of the rendered surface. In this application, the term "pan-scan" refers to showing a portion of a total image using a viewport of a display device.

Introduced herein are various embodiments of a system and method for effectively performing a pan-scan of a surface that exceeds the resolutions of the displays that are connected across multiple client GPUs and the encoding capacity of a central server. The system and method embodiments described herein know which portion of the rendered surface would actually be displayed by the client at the time of encoding and encode and transmit only that portion to the respective client systems/GPUs. As such, the time and burden previously placed on the buses, e.g., PCI and network, and encode engines are lessened and the rendered surface may be displayed with uncompromised fine details.

Before describing various embodiments of the graphics server and method for performing an ultra-high resolution pan-scan on displays connected across multiple systems/GPUs, a graphics processing system within which the graphics server and method may be embodied or carried out will be described.

FIG. 1 is a block diagram of one embodiment of a server-client graphics processing system 100. The system 100 includes a central server 110, multiple clients 130-1, 130-2, 130-3, and a network 120. The multiple clients 130-1, 130-2, 130-3, are sometimes collectively referred to herein as the clients 130s. Only three clients 130s are shown for illustration purpose and the numbers of the clients are not limited to such. As their names suggest, the central server 110 represents a centralized provider of a resource or service and the clients 130s represents service requesters in a client/server model. In some embodiments, the clients 130s are computing devices with displays.

In the illustrated embodiment, the server 110 includes a GPU 111, an encode engine 112, a copy engine 113, and a network interface card 114 (NIC). Although not illustrated, the server 110 also includes a bus, a video memory and a system memory.

The GPU 111 is configured to render a surface that exceeds resolutions of displays connected to the clients 130s. In one embodiment, the surface is a mosaic surface having a resolution of 16K×16K, which exceeds an encoding capacity of an encode engine in the server 110.

The encode engine 112 is configured to encode only a portion of the rendered surface that corresponds to the viewport coordinates of a display connected to one of the clients 130-1, 130-2, 130-3. In one embodiment, the encode engine 112 is an encode engine found in Nvdia®'s Kepler or Maxwell, which is capable of encoding up to a 4K×4K surface, and the viewport of the client is 4K×2K.

The copy engine 113 is configured to copy the encoded portion of the rendered surface from the video memory to the system memory of the server 110. As the encoded portion is not bigger than 4K×4K, it is manageable by the copy engine 113 and the bus of the server 110. More importantly, it does not adversely affect other processes simultaneously running in the server. In one embodiment, the copy engine 113 is an asynchronous copy engine such as one found in Kepler or Maxwell.

The NIC 114 is configured to receive viewport coordinates from the clients 130s. In the illustrated embodiment, the viewport coordinates are received before the rendered surface is encoded so that the encode engine 112 can encode only a portion of the rendered surface that corresponds to the received viewport coordinates.

The NIC 114 is further configured to send the encoded portion of the rendered surface to the respective client, i.e. one of the clients 130s that sent the coordinates. In the illustrated embodiment, the encoded portion is sent to the client over the network 120.

In the illustrated embodiment, the clients 130-1, 130-2, 130-3 include GPUs (not shown) and displays 135-1, 135-2, 135-3 that are configured to scan out the encoded portion of the rendered surface received from the server 110. In one embodiment, the encoded portion is displayed, i.e. scanned out, at a native timing/resolution of the display connected to the client. In another embodiment, the encoded region is scanned out at a higher timing/resolution using a display scaling.

In the illustrated embodiment, the network 120 is configured to facilitate the communication between the server 110 and the clients 130-1, 130-2, 130-3. In one embodiment, the network 120 is a wired network. In another embodiment, the network 120 is a wireless network or a hybrid network having both wired and wireless networks. In yet another embodiment, the network 120 is a collection of interconnects, e.g., PCI buses, between the server 110 and the clients 130-1, 130-2, 130-3.

FIG. 2 is a flow diagram of a method 200 for performing an ultra-high resolution pan-scan on displays connected across multiple client GPUs that is carried out according to the principles of the disclosure. As used herein, the term "ultra-high resolution" refers to a resolution that exceeds resolutions of displays connected to the client GPUs and an encoding capacity of a central server. This method is carried out from the perspective of a central server in a server-client graphics processing system such as the one shown in in FIG. 1. In one embodiment, the server 110 is configured to perform the method 200.

In a step 210, a server renders a surface that exceeds resolutions of displays connected to client GPUs. In one embodiment, resolutions of the client displays are 4K×2K, and the rendered surface is a 4×4 mosaic surface having a 16 k×16 k resolution. It is noted that the resolutions of the client displays and rendered surface are not limited to the above examples.

In a step 220, the server receives viewport coordinates in terms of the rendered surface from one of the clients. In one embodiment, the viewport coordinates are received by the server's NIC using a Nvidia®'s NVAPI or Windows Management Instrumentation (WMI) interface.

In a step 230, the server sends the viewport coordinates and the rendered surface to an encode engine of the server. In one embodiment, the server copies a portion of the rendered surface that corresponds to the viewport coordinates to a memory location and then feeds this portion to the encoding engine as an input.

In a step 240, the encoding engine only encodes a portion of the rendered surface that corresponds to the viewport coordinates. In one embodiment, the encode engine is a part of Kepler or Maxwell that is capable of encoding a surface having a 4K×4K resolution.

In a step 250, the server copies the encoded portion from its video memory to its system memory. In one embodiment, the encoded region is copied using an asynchronous copy engine. It is noted that as only the encoded portion is copied, the amount of data involved in copying is manageable by the copy engine and hence, does not adversely affect the other on-going processes of the server.

In a step 260, the server sends the encoded portion to the client that sent the request. In one embodiment, the client receives the encoded portion over a network such as a wired, wireless or hybrid network, or a collection of interconnects, e.g., PCI buses, from the client. In an embodiment where the network is a collection of interconnects, the server sends the encoded region directly to a video memory of recipient client.

FIG. 3 is a flow diagram of a method 300 for performing an ultra-high resolution pan-scan on displays connected across multiple client GPUs that is carried out according to the principles of the disclosure. This method 300 is carried out from the perspective of a client of a server-client graphics processing system such as one of the clients 130s in in FIG. 1. In one embodiment, the client 130-1, 130-2, or 130-3 is configured to perform the method 300.

In a step 310, one of the clients receives user inputs of a pan scan operation. In one embodiment the user inputs are received via a user interface of the clients, such as a mouse or a keyboard.

In a step 320, the client calculates the viewport coordinates from the received user inputs in terms of a surface being rendered at a central server. The surface being rendered at the server is an ultra-high resolution surface that exceeds resolution of a display connected to the client and an encoding capacity of the server. In one embodiment, the client's display has a 4K×2K resolution and the server's encoding capacity is 4 k×4 k. In another embodiment, the rendered surface is a 4×4 Mosaic surface having a 16 k×16 k resolution.

In a step 330, the client sends the calculated viewport coordinates to the server. In one embodiment, the viewport coordinates are received by the server using a NVAPI/WMI interface.

In a step 340, the client receives an encoded portion of the rendered surface that corresponds to the calculated viewpoint coordinates. In one embodiment, the client receives the encoded portion over the network, such as a wired, wireless or hybrid network, or a collection of interconnects, e.g., PCI buses, from the server.

In a step 350, the client scans out the encoded portion in its display. In one embodiment, the encoded portion is scanned out at a native timing/resolution of the client's display. In another embodiment, the encoded region is scanned out at a higher timing/resolution using a display scaling. In such an embodiment, the encoded region is displayed in a finer granularity than that of the original surface.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

The above-described system and methods or at least a portion thereof may be embodied in or performed by various processors, such as digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods or functions of the system described herein.

Certain embodiments disclosed herein further relate to computer storage products with a non-transitory computer-readable medium that have program code thereon for performing various computer-implemented operations that embody the apparatuses, the systems or carry out the steps of the methods set forth herein. Non-transitory medium used herein refers to all computer-readable media except for transitory, propagating signals. Examples of non-transitory computer-readable medium include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

What is claimed is:

1. A method for performing an ultra-high resolution pan-scan on displays connected across multiple client graphics processing units (GPUs), the method comprising:
rendering a surface;
receiving viewport coordinates of one of said displays that is connected to one of said multiple client GPUs;
encoding only a portion of said surface that corresponds to said viewport coordinates when a resolution of said surface exceeds resolutions of said displays and said resolution of said surface exceeds an encoding capacity of an encode engine in a server; and
sending said portion to said one of said multiple client GPUs.

2. The method as recited in claim 1, further comprising copying said portion from a video memory of said server to a system memory of said server.

3. The method as recited in claim 1, wherein said surface has a 16k×16k resolution.

4. The method as recited in claim 1, wherein said one display connected to said one of said multiple client GPUs has a resolution of 4k×2k.

5. The method as recited in claim 1, wherein said portion is sent over a network to said one of said multiple client GPUs.

6. The method as recited in claim 5, wherein said network is a Peripheral Component Interconnect (PCI) bus.

7. The method as recited in claim 1, wherein said encoding is carried out by said encode engine in said server.

8. A method for performing an ultra-high resolution pan-scan on displays connected across multiple client graphics processing units (GPUs), the method comprising:
calculating viewport coordinates of one of said displays that is connected to one of said multiple client GPUs;
sending said viewport coordinates to a server;
receiving only an encoded portion of said surface that corresponds to said viewport coordinates when a resolution of a surface rendered at said server exceeds resolutions of said displays and said resolution of said surface exceeds an encoding capacity of an encode engine in said server; and
scanning out said encoded portion using said one of said multiple client GPUs.

9. The method as recited in claim 8, wherein said encoded portion is encoded by said encode engine in said server.

10. The method as recited in claim 8, further comprising receiving a user input, on which said viewport coordinates are based.

11. The method as recited in claim 8, wherein said encoded portion is scanned out at a native timing of said one of said multiple GPUs.

12. The method as recited in claim 8, wherein said scanning out includes upscaling said encoded portion.

13. The method as recited in claim 8, wherein said multiple client GPUs are remotely located from said server.

14. The method as recited in claim 8, wherein said encoded portion is received over a network.

15. The method as recited in claim 14, wherein said network is a Peripheral Component Interconnect (PCI) bus.

16. A graphics server for performing an ultra-high resolution pan-scan on displays connected across multiple client graphics processing units (GPUs), comprising:
an encode engine;
a GPU configured to render a surface, wherein said encode engine is configured to encode only a portion of said surface that corresponds to viewport coordinates of one of said displays that is connected to one of said multiple client GPUs when a resolution of said surface exceeds resolutions of said displays and said resolution of said surface exceeds an encoding capacity of said encode engine in said graphics server; and a network interface card configured to receive said viewport coordinates from said one of said multiple client GPUs and send said portion to said one of said multiple client GPUs.

17. The graphics server as recited in claim 16, further comprising a copy engine configured to copy said portion from a video memory of said graphics server to a system memory of said graphics server.

18. The graphics server as recited in claim 16, wherein said viewport coordinates are received before encoding said portion of said surface.

19. The graphics server as recited in claim 16, wherein said portion is sent over a network to said one of said multiple client GPUs.

20. The graphics server as recited in claim 19, wherein said network is a Peripheral Component Interconnect (PCI) bus.

* * * * *